(12) United States Patent
Fontaine et al.

(10) Patent No.: US 11,095,377 B2
(45) Date of Patent: Aug. 17, 2021

(54) METHODS AND SYSTEMS FOR DETERMINING MORPHOLOGY DATA

(71) Applicant: CommScope Technologies LLC, Hickory, NC (US)

(72) Inventors: Laura R. Fontaine, McLean, VA (US); Joseph N. Marzin, Potomac Falls, VA (US); Saul A. Torrico, Bethesda, MD (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/649,881

(22) PCT Filed: Oct. 30, 2018

(86) PCT No.: PCT/US2018/058136
§ 371 (c)(1),
(2) Date: Mar. 23, 2020

(87) PCT Pub. No.: WO2019/112708
PCT Pub. Date: Jun. 13, 2019

(65) Prior Publication Data
US 2021/0058174 A1  Feb. 25, 2021

Related U.S. Application Data

(60) Provisional application No. 62/596,645, filed on Dec. 8, 2017.

(51) Int. Cl.
*H04B 17/391* (2015.01)
*H04B 17/318* (2015.01)
*H04B 17/373* (2015.01)

(52) U.S. Cl.
CPC ....... *H04B 17/3912* (2015.01); *H04B 17/318* (2015.01); *H04B 17/373* (2015.01); *H04B 17/3913* (2015.01)

(58) Field of Classification Search
CPC .............. H04B 17/3912; H04B 17/318; H04B 17/373; H04B 17/3913
See application file for complete search history.

(56) References Cited

U.S. PATENT DOCUMENTS 6,477,376 B1  11/2002 Carter
6,665,542 B1 * 12/2003 Clancy ................. H04W 16/18
                                                           455/504

(Continued)

OTHER PUBLICATIONS

International Bureau, "International Preliminary Report on Patentability from PCT Application No. PCT/US2018/058136", from Foreign Counterpart to U.S. Appl. No. 16/649,881, dated Jun. 18, 2020, p. 1 through 7, Published: WO.

(Continued)

*Primary Examiner* — Nguyen T Vo
(74) *Attorney, Agent, or Firm* — Fogg & Powers LLC

(57) ABSTRACT

Techniques for more effectively and efficiently obtaining current morphology data are described. Measurement data is transmitted by user equipment to a central location such as a communication network or another entity such as in remote servers, e.g. the cloud. The recipient of such data, or a third party that receives such data from the recipient, utilizes the data, e.g. signal strength measurements and related data, to determine morphology data for corresponding geographic locations, e.g. altitude, longitude, and latitude.

24 Claims, 6 Drawing Sheets

(56) References Cited

U.S. PATENT DOCUMENTS

| | | |
|---|---|---|
| 7,035,632 B2 | 4/2006 | Gutowski |
| 7,055,107 B1 | 5/2006 | Rappaport et al. |
| 2004/0116111 A1 | 6/2004 | Saunders |
| 2006/0199546 A1* | 9/2006 | Durgin .............. H04B 17/318 455/67.11 |
| 2007/0010204 A1* | 1/2007 | Hubner .............. H04W 16/00 455/63.1 |
| 2009/0319236 A1 | 12/2009 | Blaunshtein et al. |

OTHER PUBLICATIONS

International Searching Authority, "International Search Report and Written Opinion from PCT Application No. PCT/US2018/058136", dated Mar. 11, 2019, pp. 1-11, Published: WO.

* cited by examiner

METHODS AND SYSTEMS FOR DETERMINING MORPHOLOGY DATA

REFERENCE TO RELATED APPLICATION

This application claims priority to International Patent Application No. PCT/US2018/058136 filed on Oct. 30, 2018, which claims the benefit of U.S. Provisional Patent Application Ser. No. 62/596,645, filed on Dec. 8, 2017, the contents of both of which are hereby incorporated herein by reference in their entirety.

BACKGROUND

Small cells (such as pico, micro and metro cells) are being deployed in urban environments to alleviate macro cell network congestion. Small cells are typically deployed in and about clutter. Clutter may also be referred to as morphology. Morphology means natural surface features above terrain and man-made structures above terrain. Natural surface features include vegetation and bodies of water. Morphology can have a dramatic effect upon radio wave propagation in small cells, dominating any propagation effects of terrain.

Morphology data must be accounted for when modeling propagation characteristics of a small cell to ensure that the cell design operates as intended. Morphology data includes data about land use and land cover surface features. Land use means man made structures. Land cover means natural surface features. Morphology data is used by propagation modelling software.

Morphology data includes morphology classification(s). Morphology classifications are types of man-made structures and natural surface features including for example urban, densely urban, residential, forest, water, and agricultural. Morphology data includes parameters that describe the location and height of man-made structures (such as buildings) and of natural surface features (such as foliage).

Morphology and terrain data are stored in databases in grid matrix, vector, and/or raster form. Propagation models utilize morphology type and morphology data to provide improved prediction over propagation models using solely terrain data.

Morphology data is not readily available for all regions. When available, morphology data may not be current. If not available, image processing of satellite or light detection and ranging (LiDAR) imaging is used to generate morphology data. Procuring morphology data this way is expensive. Also, such data is static, representing morphology at an instance of time, and over time loses accuracy. Therefore, there is a need to improve morphology databases and acquisition systems to more cost effectively and efficiently generate current morphology data.

SUMMARY OF THE INVENTION

A method for determining morphology parameters is provided, comprising: determining an average value of at least one morphology parameter based upon at least one new value of the morphology parameter; determining at least one predicted path loss based upon the average value of at least one morphology parameter and the morphology type; determining at least one difference between each pair of measured path loss and predicted path loss; determining values of statistical parameters of the at least one difference; determining if the values of the statistical parameters meet statistical requirements; if the values of the statistical parameters meet the statistical requirements, storing the average value of morphology parameters; and if the values of the statistical parameters do not meet the statistical requirements, then optimizing the average value of the at least one morphology parameter.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
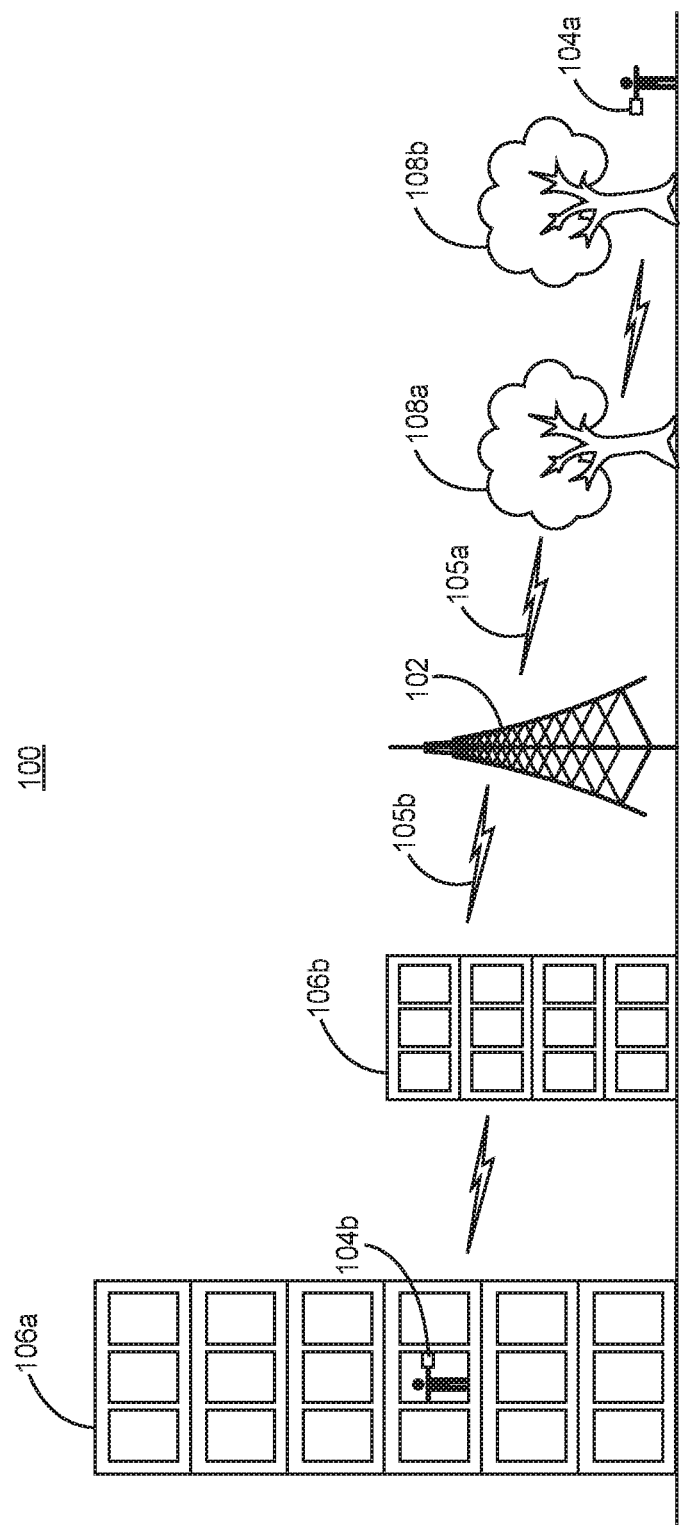
FIG. 1 illustrates a diagram of one embodiment of user equipment communicating through a cell of a communications network including a geographic and emissions data system.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

Techniques for more effectively and efficiently obtaining current morphology data are described. User equipment utilizing a communications network measures received signal strength and geographic location transmitted by, e.g. a cell of, the communications network. By using many user equipment that are otherwise utilizing the communications network for another intended purpose, i.e. allow for communications between the user equipment and other device(s) and/or system(s), this technique uses crowd sourcing to collect data. Measurement data is transmitted by the user equipment to a central location such as the communications network or another entity such as in remote servers, e.g. the cloud. The recipient of such data, or a third party that receives such data from the recipient, utilizes the data, e.g. signal strength measurements and related data, to determine morphology data for corresponding geographic locations, e.g. altitude, longitude, and latitude.

FIG. 1 illustrates a diagram of one embodiment of user equipment communicating through a cell of a communications network including a geographic and emissions data system 100. A first user equipment 104a forms a first communications link 105a with a cell 102 that is part of a communications network. The signals between the first user equipment 104a and the cell 102 must pass through trees 108a, 108b which affect received signal strength. A second user equipment 104b, in a building, forms a second communications link 105b with the cell 102. The signals between the second user equipment 104b and the cell 102 must pass through a first building 106a, and through and/or around and at least one adjacent building 106b, which can affect signal strength. Thus, the user equipment 104a, 104b may receive signals with diminished power levels from the cell 102.

Morphology data for the regions between the user equipment 104a, 104b and the cell 102 can be characterized using data including the geographic locations of the user equipment 104a, 104b and the cell 102, and the received signal strengths of the user equipment 104a, 104b. The terms location and geographic location are used herein interchangeably.

The user equipment 104a, 104b communicates its geographic location and received signal strength to the cell 102. The user equipment 104a, 104b and the cell 102 convey this information to a geographic and emission data system, e.g. in the communications network. Alternatively, the geographic and emission data system could be located remotely, and be communicatively coupled to the user equipment by the communications network. The illustrated cell 102 is a macro cell, however in other embodiments the cell 102 can be a small cell.

User equipment, e.g. smart phones, phablets, and tablets, are typically equipped with global navigation satellite system receiver such as a GPS receiver. The user equipment can determine its location with such a GPS receiver alone, or with information provided by communications network such as assisted global navigation satellite system data or enhanced cell identification (e.g. using angle of arrival and/or round-trip time techniques). The user equipment radio systems are typically designed to characterize received signal strength, such as reference signal received power level (RSRP). The user equipment reports its received power level and location through the cell to the network as a result of a network request, or periodic or random updates. The network can provide such power and geographic location data to the geographic and emissions data system.

Alternatively, standalone applications in, and/or modifications to the operating systems of, the user equipment and/or the network can be used to obtain such location and received signal strength data from user equipment; standalone applications may be used to obtain more precise data and/or to limit the amount data transmitted thus reducing consumed communications network data bandwidth. For example, such an application in or modification to the user equipment can trigger data reporting upon movement of the user equipment, e.g. greater than a predefined threshold of distance.

User equipment may also be able to provide additional data, e.g. to ascertain whether the user is within or outside of a building. For example, the user equipment may have mapping software that can be used with the location data from GPS receiver to determine if the user equipment is inside or outside a building. For example, a morphology analysis system (subsequently described) can compare the altitude of the user equipment to the terrain elevation to determine if the user equipment is in a building; if the altitude of the user equipment is substantially greater than the corresponding terrain elevation then that is indicative that the user equipment is in a building. Most user equipment includes ambient light sensors to control backlighting of displays, and can be used to determine if there is light incident upon the user equipment and whether the light is sunlight or is from a man-made lighting source. In one embodiment, an application running on the user equipment can ascertain whether the user equipment is operating inside or outside the building, e.g. using the aforementioned techniques. Alternatively, raw data from sensors such as the ambient light sensor and/or the GPS sensor can be communicated to another system (such as the geographic and emissions data system), e.g. which may have accurate maps that can make such a determination.

Figure 2:
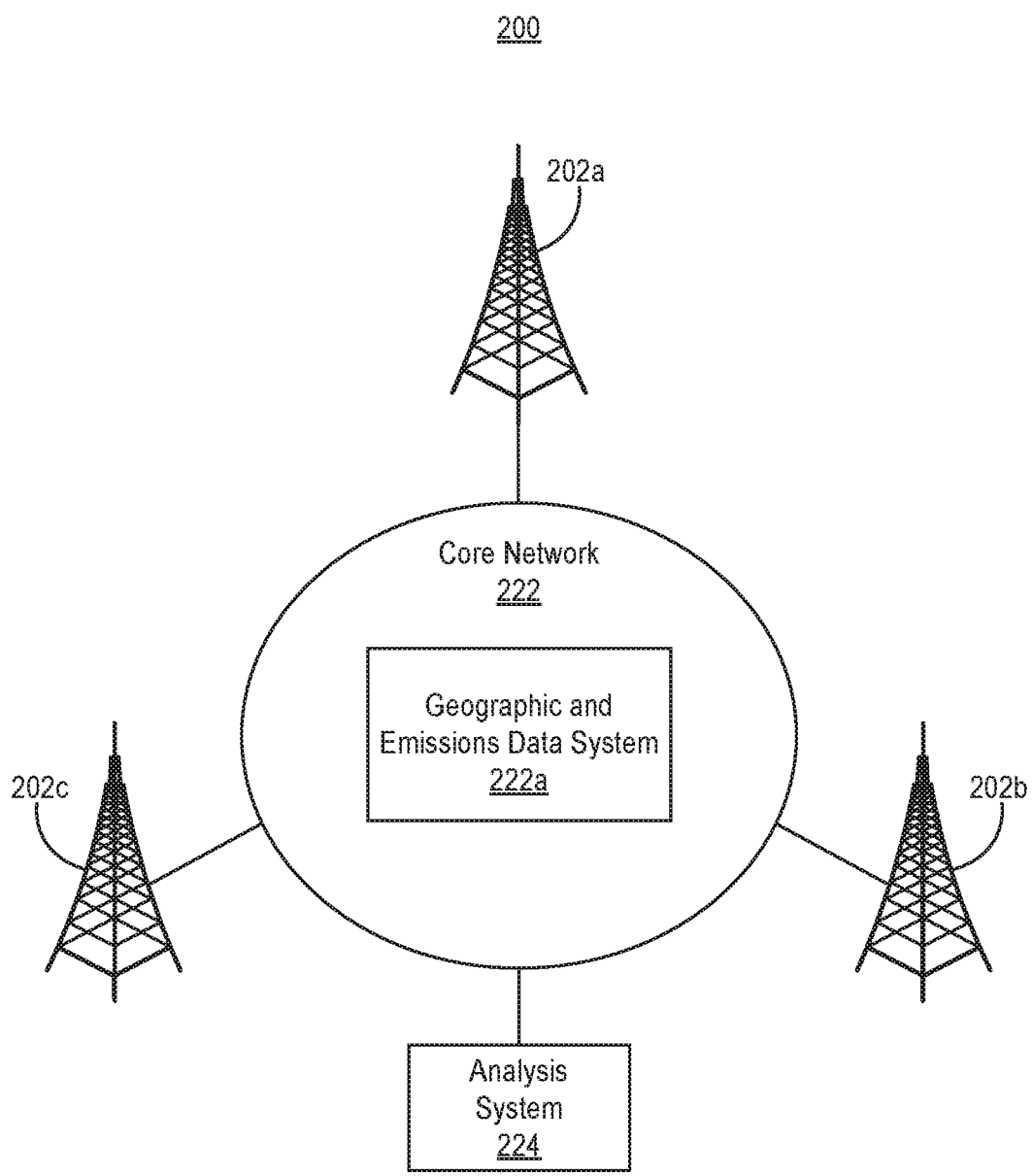
FIG. 2 illustrates a block diagram of one embodiment of a communications network coupled to an analysis system.

FIG. 2 illustrates a block diagram of one embodiment of a communications network coupled to an analysis system 200. The communications network 200 includes cells 202a, 202b, 202c coupled to a core network 222. User equipment, such as those illustrated in FIG. 1, communicate with the cells 202a, 202b, 202c. The communications network 200 may be a macro cell network, a small cell network, or a combination of the two. Data to and from user equipment is routed through the core network 222 which provides services to the user equipment, including routing such data. In the illustrated embodiment, the core network 222 includes a geographic and emission data system 222a. The geographic and emission data system 222a, however, can be located in other equipment of the communications network 200. However, often, the geographic and emission data system 222a is external, but coupled, to the communications network 200. In another embodiment, the geographic and emission data system 222a includes received power level and corresponding geographic location data received from user equipment, and cell transmit power level and/or frequency obtained from a corresponding cell 202a, 202b, 202c or the core network 222 (if the geographic and emission data system 222a is external to the communications network 200). In a further embodiment, the geographic and emission data system 222a also generates requests for such data from the user equipment and/or the cells 202a, 202b, 202c or core network 222.

The geographic and emission data system 222a also includes other corresponding information related to the received power level and corresponding geographic location data at user equipment, including a transmit frequency of the cell whose received power level is measured by user equipment, an identifier for the cell, the geographic location of the antenna (of the cell 102) that transmits a signal received by the cell, and the equivalent isotropic radiated power (EIRP) of the cell that transmits the received signal. Such information may be provided by user equipment or by the communications network 200, e.g. the core network 202. The user equipment may also provide corresponding information including sensor data or data indicating whether it is inside of a building.

The power and corresponding geographic location data received from user equipment and the corresponding information shall be hereinafter referred to as total geographic and emission data. Total geographic and emission data may also include data from sensor(s) of the user equipment.

The core network 222 is coupled to an analysis system 224. In the illustrated embodiment, the morphology analysis system 224 is part of the communications network 200 but separate from the core network 222. In another embodiment, the morphology analysis system 224 is part of the core network 222. In a further embodiment, the analysis system 224 is coupled to the communications network 200 but is not part of the communications network 200; for example, the morphology analysis system 224 may be located at an entity that generates morphology databases for use by communications systems' designers or an entity that designs communications systems. In yet a further embodiment, power and corresponding geographic location data are communicated from the geographic and emission data system 222a to the morphology analysis system 224.

If an entity other than the communications network operator owns or uses the morphology analysis system 224, then the geographic and emission data system 222a may alternatively be located in the morphology analysis system 224. In one embodiment, for such a case, the user equipment would execute an application to capture information about the received signal, such as received signal strength and frequency. The application would transmit such data and geographic location data, e.g. through the communications network 200 to the geographic and emission data system 222a. The communications network operator would still provide the geographic and emission data system 222a information, e.g. antenna geographic location and cell EIRP about the cell broadcasting the signal received by the user equipment.

Figure 3:
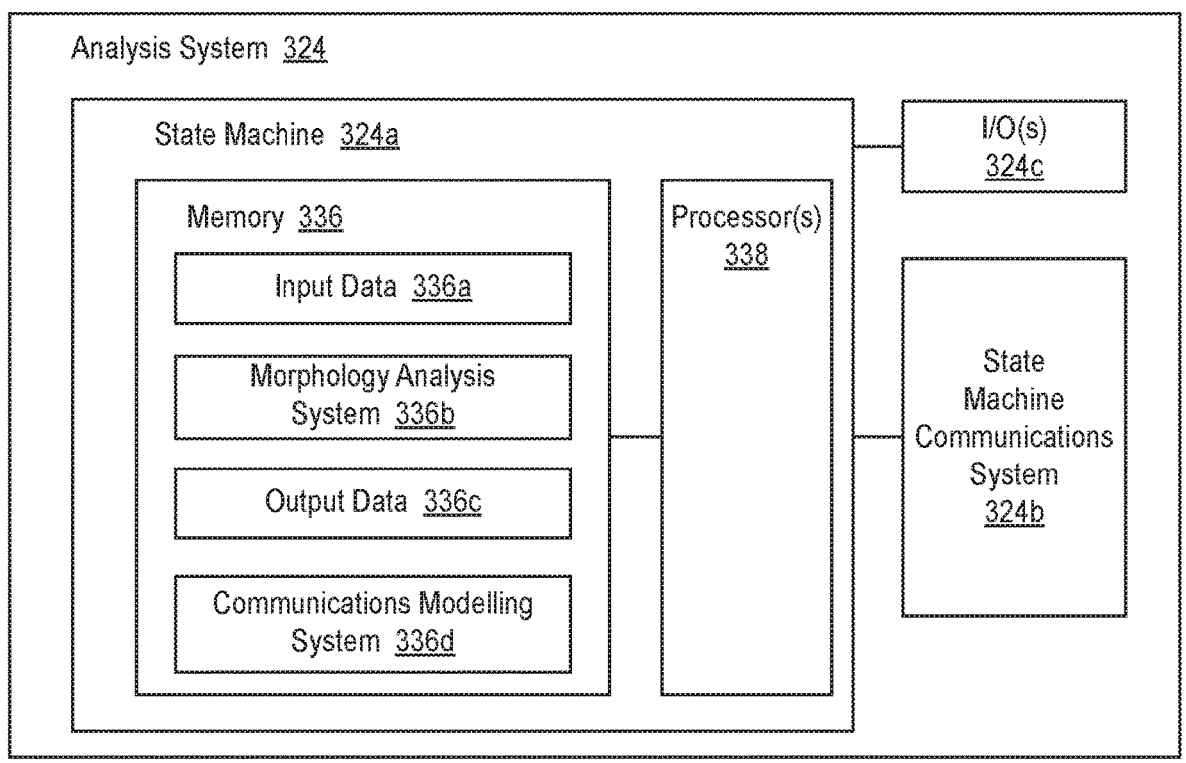
FIG. 3 illustrates a block diagram of one embodiment of a morphology analysis system.

FIG. 3 illustrates a block diagram of one embodiment of an analysis system 324. The analysis system 324 includes a state machine 324a. In the illustrated embodiment, the state machine 324a includes a memory 336 coupled to at least one processor (processor(s)) 338. For example, the state machine may be implemented by a combination of processor(s), e.g. a central processing unit(s) and/or digital signal processor(s), coupled to memory. However, the state machine 324a can be implemented in other ways for example with field programmable gate arrays and/or application specific integrated circuit which may include and/or be coupled to memory. The memory may, for example, include random access memory, read only memory, flash memory, and/or magnetic memory.

In the illustrated embodiment, the memory 336 includes input data 336a, a morphology analysis system 336b, and output data 336c. Optionally, in one embodiment, the memory 336 also includes a communications modeling system 336d. The communications modeling system 336d is used to model communications networks, and utilizes morphology data generated by the morphology analysis system 336b.

The input data 336a includes data obtained from user equipment and the communications network, e.g. the core network, as described above. The input data 336a also includes morphology data and/or terrain data for a region where morphology parameters will be determined. Such morphology data and terrain data are obtained from external databases, such as respectively the United States Geological (USGS) Service's Land Use/Land Cover (LULC) database and terrain database. Morphology and/or terrain data may be obtained or supplemented by other sources such as LiDAR measurement data and mapping data, e.g. from Google maps. Optionally, in one embodiment, the morphology analysis system 336b transforms morphology types used by and corresponding to data provided by an external database to, e.g. fewer, corresponding morphology types used by the morphology analysis system 336b.

The morphology analysis system 336b generates parameters for the morphology types that it uses. Exemplary methods for doing so are subsequently illustrated. Such parameters are stored as output data 336c. Optionally, the morphology analysis system 336b includes a Monte Carlo analysis system which can be used to, e.g. generate modeled path loss (or a difference between measured and modeled path loss) for a variety of range of morphology parameters of different morphology types. The Monte Carlo analysis engine utilizes the subsequently described propagation model.

In one embodiment, prior to commencing any analysis with the morphology analysis system 336b, estimated averages of value(s) morphology parameter(s) of different morphology types and/or estimated statistics (mean and standard deviation) for propagation losses for different morphology types are stored in the input data 336a. Such data may be provided by a designer or user of the morphology analysis system 336b, and may be based on prior measurement and/or simulation data.

Optionally, the analysis system 324 includes at least one input/output device (I/O(s)) 324c and/or a state machine communications system 324b. The I/O(s) 324c comprise display(s) (such as a touch screen), cursor control device(s) (such as a mouse), keyboard(s), and/or speaker(s). The I/O(s) 324c may be used to enter into and display from the state machine 324a. For example, the I/O(s) 324c permit the designer and/or the user of the morphology analysis system 336b to enter data, e.g. the estimated average value(s) of morphology parameter(s) of different morphology types and/or statistics requirements (e.g. mean and standard deviation) for different morphology types. The I/O(s) 324c may also display analysis results. The state machine communications system 324b may be a modem, e.g. used to connect to remote systems and/or communications networks. The state machine communications system 324b may be used to permit remote entry and display of data, and to display analysis results.

Figure 4:
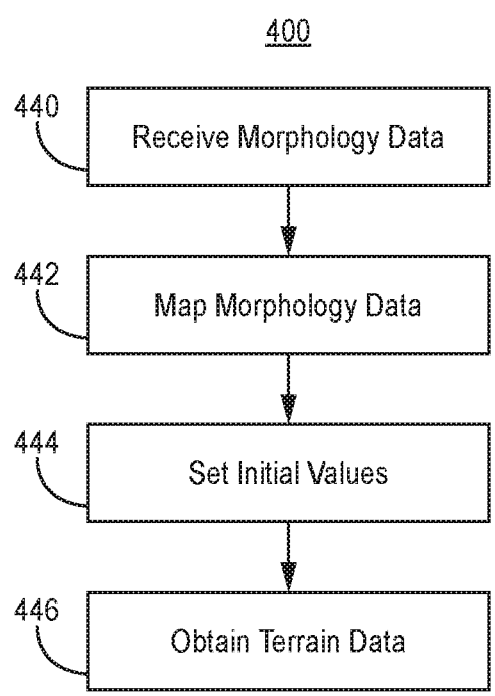
FIG. 4 illustrates one embodiment of a method of obtaining morphology data.

FIG. 4 illustrates one embodiment of a method of obtaining morphology data 400. To the extent the method 400 shown in FIG. 4 is described herein as being implemented in the system shown in FIGS. 1-3, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 440, receive morphology data for a geographic region, e.g. as described above. Optionally, in one embodiment, request such morphology data so that it is received. In another embodiment, the received morphology data includes morphology classes and parameters corresponding to each class. In a further embodiment, the received morphology data includes the morphology type at different geographical locations within a geographical region. In yet another embodiment, the morphology data includes historical averages and/or supplemental morphology data (from other data sources) for the morphology parameters. In yet a further embodiment, the morphology data is received from external database(s). In one embodiment, the received morphology data includes aforementioned tolerance levels.

Optionally, in block 442, map the received morphology classes to morphology classes used, e.g. by the morphology analysis system 336b. For example, the morphology classes used, e.g. by the morphology analysis system 336b, may be reduced from those provided by an external database and include for example only the following classes: suburban area low density with vegetation, suburban area, urban low density, open area, deciduous forest, evergreen forest, and water.

In block 444, set initial values for parameters of morphology classes, e.g. used by the morphology analysis system 336b. The initial values are provided with the aforementioned received morphology data, by the user, and/or by the morphology analysis system designer. Optionally, in block 446, obtain terrain data, e.g. from external database(s).

Figure 5:
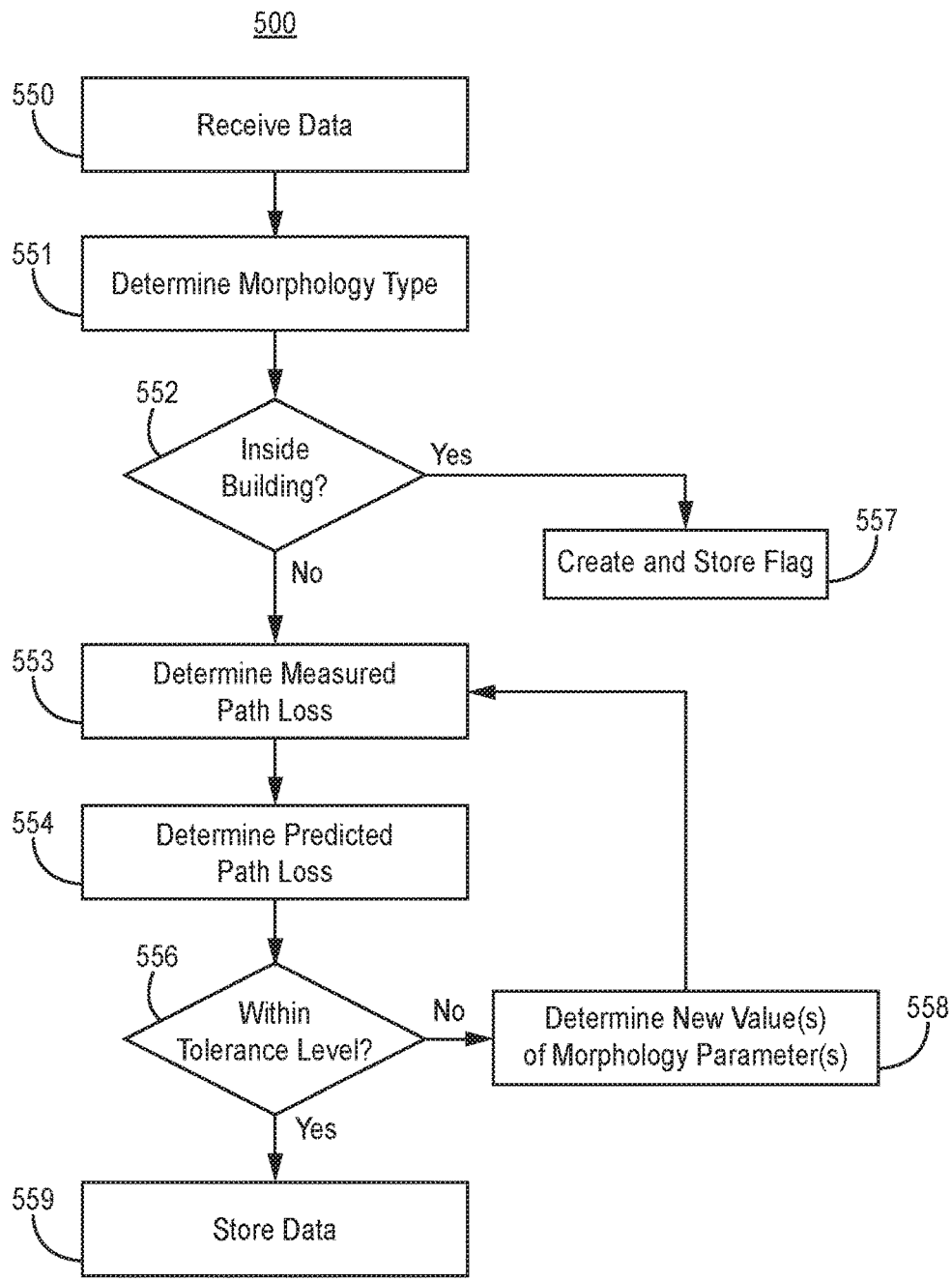
FIG. 5 illustrates one embodiment of a method of obtaining value(s) of morphology parameter(s) with respect to one set of total geographic and emission data.

FIG. 5 illustrates one embodiment of a method of obtaining value(s) of morphology parameter(s) with respect to one set of total geographic and emission data 500. To the extent the method 500 shown in FIG. 5 is described herein as being implemented in the systems shown in FIGS. 1-3, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 550, receive one set of new total geographic and emission data for a communications link, e.g. from user equipment and/or the core network. For example, the communications link is formed between a user equipment and a cell. In one embodiment, the received data is stored, e.g. in the input data 336a.

In block 551, determine morphology type for the geographic region associated with the new total geographic and emission data. For example, the geographic region is between the user equipment and the cell forming the communications link. In one embodiment, this is accomplished by associating the geographic location of the user equipment and/or the associated cell with morphology data received, e.g. from a morphology database.

Optionally, in block 552, determine whether the user equipment is in a building, e.g. using one or more of the techniques described above. If the user equipment is not determined to be in the building, then proceed to block 553. If the user equipment is determined to be in a building then in block 557 create and store a flag indicating that the user equipment is in a building.

In block 552, determine measured path loss by subtracting the received power level measured by the user equipment from the cell EIRP. In block 554, determine predicted path loss. Predicted path loss is calculated using a path loss model accounting for morphology and the types of morphology utilized in the present invention. For example, the Okumura, a modified Okumura model such as the Electronic Communications Committee (ECC) ECC-33 model, or another model may be used. The Okumura model may be expressed as:

$$L = L_{FSL} + A_{MU} - H_{MG} - H_{BG} - \Sigma K_{correction}, \text{ where}$$

L is median path loss (decibels (dB));
$L_{FSL}$ is free space loss (dB);
$A_{MU}$ is median attenuation (dB);
$H_{MG}$ is mobile station antenna height gain factor;
$H_{BG}$ is base station antenna height gain factor; and
$K_{correction}$ is correction factor gain, e.g. based upon morphology.

More complex models may use more detailed information, e.g. average building height and street width for an urban morphology class. A general form of such a model may be:

$$L = C_1 + C_2 \log(d) + C_3 \log(h_{eff}) + C_4 \log(h_{eff})\log(d) + C_5 h_{meff} + C_6 \text{Diff} + C_7,$$

where
$C_x$ are propagation coefficients;
d is distance from base station to mobile device;
$h_{eff}$ is effective antenna height of base station;
$h_{meff}$ is effective antenna height of mobile; and
Diff is diffraction parameter which may be based upon, e.g. building and vegetation characteristics such as height.

Sensor data may be used to determine if user equipment is within a building, and thus account for through building propagation losses.

The propagation coefficients are derived from the value(s) of morphology parameter(s) of the morphology type of the geographic region being characterized. If no value(s) of morphology parameter(s) have been calculated using the invention, then the aforementioned estimated value(s) of the morphology parameter(s) are used.

In block 556, determine whether the difference between the actual and predicted path losses is within a tolerance level, e.g. a certain decibel level. For example, determine whether the absolute value of the difference is less than or less than or equal to a tolerance level. In one embodiment, the tolerance level may be set by the designer or the user of this methodology, e.g. the designer or user of the analysis system 324.

If the difference is within the tolerance level, then in block 559, store the morphology parameters associated with regions between the user equipment and cell, e.g. in the output data 336c. If the difference is not within the tolerance level, then in block 558, determine new value(s) of morphology parameter(s), e.g. by optimization. Then, return to block 552.

In one embodiment, optimization is performed using Monte Carlo analysis of the morphology parameters to ascertain what set of values of morphology parameters result in the lowest difference between measured and modelled path loss. In another embodiment, optionally, only the values of two or three morphology parameters of a morphology type are varied, e.g. building height and road width for an urban morphology type. The Monte Carlo analysis generates combinations of random values for such morphology parameters, and calculates the difference in modeled path loss (using a combination) and measured path loss. In a further embodiment, the number of combinations and range of values for the morphology parameters, and the morphology parameters varied, is determined by the system designer or user. In a further embodiment, other optimization techniques can be used in lieu of Monte Carlo analysis.

Figure 6:
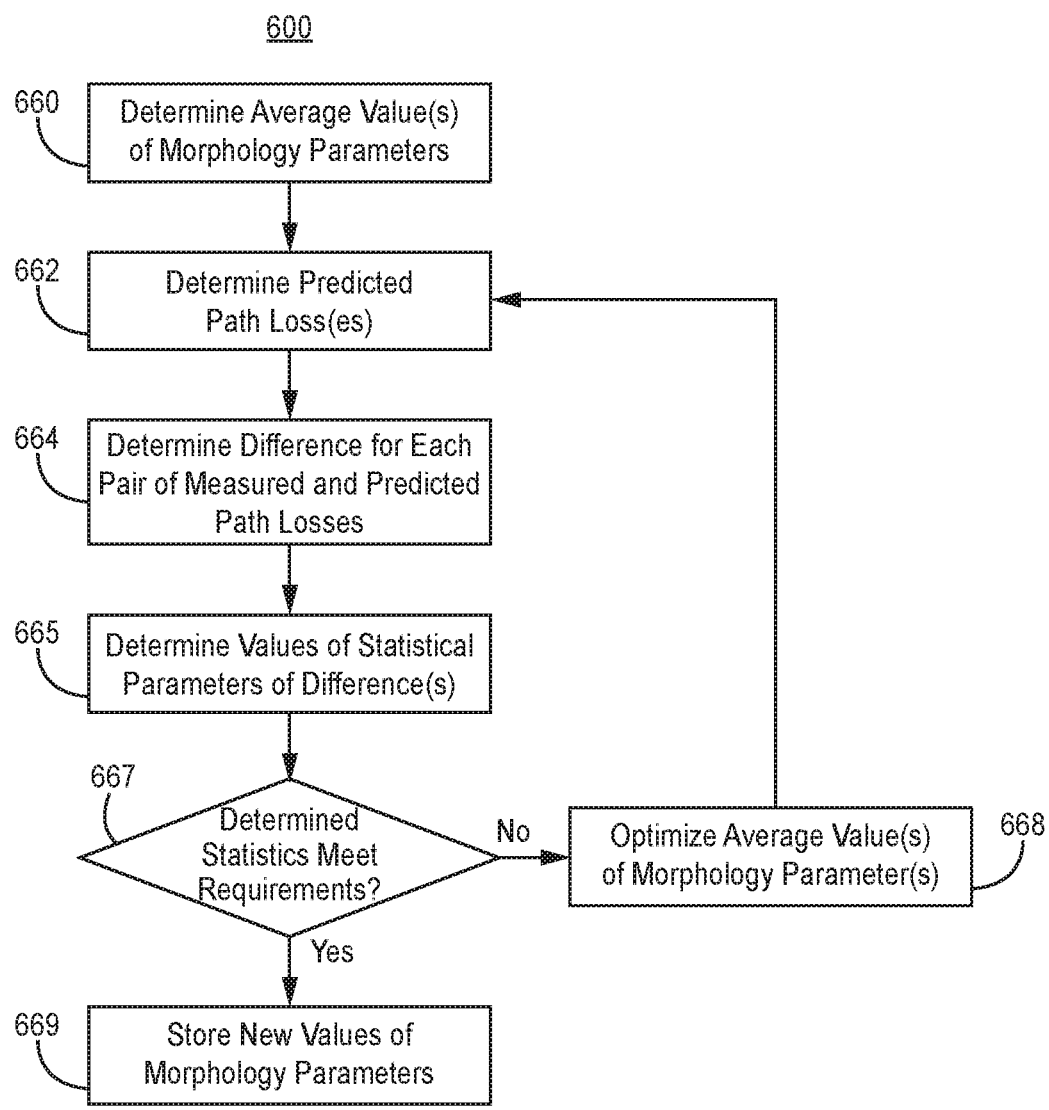
FIG. 6 illustrates one embodiment of a method of determining morphology parameter(s) of one morphology type based upon new measurement(s) and historical data.

After the method of obtaining morphology data 500 has been performed at least once for a particular morphology type, then a method of determining morphology parameter(s) of one morphology type can be performed based upon new measurement(s) and historical data. FIG. 6 illustrates one embodiment of a method of determining morphology parameter(s) of one morphology type based upon new measurement(s) and historical data 600. To the extent the method 600 shown in FIG. 6 is described herein as being implemented in the systems shown in FIGS. 1-3, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 660, determine average value(s) for morphology parameter(s) for the one morphology type. This is done by adding the determined parameter(s) value(s) for the morphology type to the historical average(s) of such parameter(s) based upon prior analysis. Historical data may be provided by or supplemented by data acquired by other means, such as other types of propagation loss measurements.

If there is no historical data, then the initial estimates are used. The average is calculated by dividing the total by the parameters values calculated above by the number of corresponding analyses (new and historical). If initial estimates are used, then the number of historical analyses is one, or another number selected by the system designer or user.

In block 662, using the new average value(s) for the morphology parameter(s), determine predicted path loss(es) for prior measurements corresponding to the morphology type. Corresponding prior measurements may be all prior measurements associated with the morphology type, or just a subset thereof.

In block 664, determine a difference for each pair of predicted, and corresponding measured path losses. In block 665, determine the values of statistical parameters for the difference(s). In one embodiment, the statistical parameters are the mean and standard deviation of the difference(s). However, other statistical parameters can be used in this method 600, for example median and median absolute deviation.

In block 667, determine if the statistics meet statistical requirements. The statistical requirements are values of the statistics the differences which the statistics must fall within, e.g. be less than or less than or equal too, or fall between. For example, the mean of the difference may have to be less than or equal to 0.5 dB, and the standard deviation may have to be less than 9 dB.

If the statistics meet the statistical requirements, then store the value(s) of the morphology parameter(s), e.g. in the output data 336c. If the statistics do not meet the statistical requirements, then perform an optimization of the average value(s) of the morphology parameter(s), e.g. by performing a regression analysis. Then, return to block 662.

A state machine, or any other processing system utilized in lieu of the state machine, used in the present system and method can be implemented using software, firmware, hardware, or any appropriate combination thereof, as known to one of skill in the art. State machine may more generally be referred to herein as a processing system.

The processor(s) 338 may be implemented by circuitry, and may be referred to alternatively herein as processor circuitry. By way of example and not limitation, the processor(s) 338 include one or more of each of microprocessor circuitry, microcontroller circuitry, Digital Signal Processors (DSP) circuitry, Application Specific Integrated Circuits (ASICs), programmable logic device circuitry, and/or Field Programmable Gate Array (FPGA) circuitry. The processing system can also include functions with software programs, firmware, or other computer readable instructions for carrying out various process tasks, calculations, and control functions used in the present method and system.

The present method can be implemented by computer executable instructions, such as program modules or components, which are executed by at least one processor. Generally, program modules include routines, programs, objects, data components, data structures, algorithms, and the like, which perform particular tasks or implement particular data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures.

The memory 336 may be implemented by circuitry, and may be alternatively herein referred to as memory circuitry. Suitable computer readable media may include storage or memory media such as the memory 338 illustrated herein. For example, the memory 338 may include magnetic media (such as conventional hard disks), optical media (such as CDs, DVDs, and Blu-ray discs, and semiconductor memory (such as Random Access Memory (RAM) (including, but not limited to, Dynamic Random Access Memory (DRAM), Synchronous Dynamic Random Access Memory (SDRAM), Double Data Rate (DDR) RAM, RAMBUS Dynamic RAM (RDRAM), and Static RAM (SRAM)), Read Only Memory (ROM), Electrically Erasable Programmable ROM (EEPROM), and Flash memory.

Exemplary Embodiments

Example 1 includes a system for determining morphology parameters, comprising: a processing system, comprising: a memory comprising a morphology analysis system; and a processor coupled to the memory; wherein, for each morphology type in a geographic region being analyzed, the morphology analysis system is configured to: determine an average value of at least one morphology parameter based upon at least one new value of the morphology parameter; determine at least one predicted path loss based upon the average value of at least one morphology parameter and the morphology type; determine at least one difference between each pair of measured path loss and predicted path loss; determine values of statistical parameters of the at least one difference; determine if the values of the statistical parameters meet statistical requirements; if the values of the statistical parameters meet the statistical requirements, store the average value of morphology parameters; and if the values of the statistical parameters do not meet the statistical requirements, then optimize the average value of the at least one morphology parameter.

Example 2 includes the system of Example 1, wherein the morphology analysis system is further configured to: receive total geographic and emission data for a first communications link; store the total geographic and emission data; determine a morphology type for the geographic region between the user equipment and the cell forming the first communications link; determine measured path loss; determine the predicted path loss based upon the total geographic and emission data, the morphology type, and at least one parameter value of the morphology type; determine if a difference between the predicted path loss and measured path loss is within a tolerance level; and if the difference is not within the tolerance level, then determine a new at least one parameter value of the morphology type.

Example 3 includes the system of Example 2, wherein the total geographic and emission data comprises sets of received power levels and corresponding geographic location data at from more than one user equipment, a transmit frequency of at least one cell whose received power level is measured by the more than one user equipment, the identifier for the at least one cell, the geographic location of an antenna of the at least one cell, and an equivalent isotropic radiated power (EIRP) of the at least one cell; and where each of the more than one user equipment are otherwise utilizing a communications network, including the at least one cell, for another intended purpose.

Example 4 includes the system of any of Examples 2-3, wherein determine the new at least one parameter value of the morphology type comprises perform a Monte Carlo simulation.

Example 5 includes the system of any of Examples 2-4, wherein the morphology analysis system is further configured to: determine whether the user equipment is inside of a building; and if the user equipment is determined to be inside of a building, then create and store a flag.

Example 6 includes the system of any of Examples 1-5, wherein the morphology analysis system is further configured to: receive morphology data for a geographic region; and set initial values for parameters of morphology classes.

Example 7 includes the system of Example 6, wherein receive morphology data comprises receive morphology classes; and wherein the morphology analysis system is further configured to map the received morphology classes to morphology classes used by the morphology analysis system.

Example 8 includes the system of any of Examples 1-7, wherein the morphology analysis system is further configured to receive terrain data.

Example 9 includes a method for determining morphology parameters, comprising: determining an average value of at least one morphology parameter based upon at least one new value of the morphology parameter; determining at least one predicted path loss based upon the average value of at least one morphology parameter and the morphology type; determining at least one difference between each pair of measured path loss and predicted path loss; determining values of statistical parameters of the at least one difference; determining if the values of the statistical parameters meet statistical requirements; if the values of the statistical parameters meet the statistical requirements, storing the average value of morphology parameters; and if the values of the statistical parameters do not meet the statistical requirements, then optimizing the average value of the at least one morphology parameter.

Example 10 includes the method of Example 9, further comprising: receiving total geographic and emission data for a first communications link; determining a morphology type for the geographic region between the user equipment and the cell forming the first communications link; determining measured path loss; determining the predicted path loss based upon the total geographic and emission data, the morphology type, and at least one parameter value of the morphology type; determining if a difference between the predicted path loss and measured path loss is within a tolerance level; and if the difference is not within the tolerance level, then determining a new at least one parameter value of the morphology type.

Example 11 includes the method of Example 10, wherein receiving the total geographic and emission data comprises receiving sets of received power levels and corresponding geographic location data at from more than one user equipment, a transmit frequency of at least one cell whose received power level is measured by the more than one user equipment, the identifier for the at least one cell, the geographic location of an antenna of the at least one cell, and an equivalent isotropic radiated power (EIRP) of the at least one cell; and where each of the more than one user equipment are otherwise utilizing a communications network, including the at least one cell, for another intended purpose.

Example 12 includes the method of any of Examples 10-11, wherein determining the new at least one parameter value of the morphology type comprises performing a Monte Carlo simulation.

Example 13 includes the method of any of Examples 10-12, further comprising: determining whether the user equipment is inside of a building; and if the user equipment is determined to be inside of a building, then creating and storing a flag.

Example 14 includes the method of any of Examples 9-13, further comprising receiving morphology data for a geographic region; and setting initial values for parameters of morphology classes.

Example 15 includes the method of Example 14, wherein receiving morphology data comprises receiving morphology classes; and further comprising mapping the received morphology classes to a different morphology classes.

Example 16 includes the method of any of Examples 9-15, further comprising receiving terrain data.

Example 17 includes a non-transitory computer readable medium storing a program causing a computer to execute a process to determine morphology parameters, the process comprising: determining an average value of at least one morphology parameter based upon at least one new value of the morphology parameter; determining at least one predicted path loss based upon the average value of at least one morphology parameter and the morphology type; determining at least one difference between each pair of measured path loss and predicted path loss; determining values of statistical parameters of the at least one difference; determining if the values of the statistical parameters meet statistical requirements; if the values of the statistical parameters meet the statistical requirements, storing the average value of morphology parameters; and if the values of the statistical parameters do not meet the statistical requirements, then optimizing the average value of the at least one morphology parameter.

Example 18 includes the non-transitory computer readable medium of Example 17, wherein the process further comprises: receiving total geographic and emission data for a first communications link; determining the morphology type for the geographic region between the user equipment and the cell forming the first communications link; determining measured path loss; determining the predicted path loss based upon the total geographic and emission data, the morphology type, and at least one parameter value of the morphology type; determining if a difference between the predicted path loss and measured path loss is within a tolerance level; and if the difference is not within the tolerance level, then determining a new at least one parameter value of the morphology type.

Example 19 includes the non-transitory computer readable medium of Example 18, wherein receiving the total geographic and emission data comprises receiving sets of received power levels and corresponding geographic location data at from more than one user equipment, a transmit frequency of at least one cell whose received power level is measured by the more than one user equipment, the identifier for the at least one cell, the geographic location of an antenna of the at least one cell, and an equivalent isotropic radiated power (EIRP) of the at least one cell; and where each of the more than one user equipment are otherwise utilizing a communications network, including the at least one cell, for another intended purpose.

Example 20 includes the non-transitory computer readable medium of any of Examples 18-19, wherein determining the new at least one parameter value of the morphology type comprises performing a Monte Carlo simulation.

Example 21 includes the non-transitory computer readable medium of any of Examples 18-20, further comprising: determining whether the user equipment is inside of a building; and if the user equipment is determined to be inside of a building, then creating and storing a flag.

Example 22 includes the non-transitory computer readable medium of any of Examples 17-21, wherein the process further comprises: receiving morphology data for a geographic region; and setting initial values for parameters of morphology classes;

Example 23 includes the non-transitory computer readable medium of any of Examples 17-22, wherein receiving morphology data comprises receiving morphology classes; and further comprising mapping the received morphology classes to a different morphology classes.

Example 24 includes the non-transitory computer readable medium of any of Examples 17-23, wherein the process further comprises receiving terrain data.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A system for determining morphology parameters, comprising:
processing circuitry that is configured, for each morphology type in a geographic region being analyzed, to:
determine an average value of at least one morphology parameter based upon at least one new value of a morphology parameter;
determine at least one predicted path loss based upon the average value of at least one morphology parameter and a morphology type, wherein path loss is a reduction in a power of a signal between two points separated by morphology of the morphology type;
determine at least one difference between each pair of measured path loss and predicted path loss;
determine values of statistical parameters of the at least one difference;
determine if the values of the statistical parameters meet statistical requirements;
if the values of the statistical parameters meet the statistical requirements, store the average value of morphology parameters; and
if the values of the statistical parameters do not meet the statistical requirements, then optimize the average value of the at least one morphology parameter.

2. The system of claim 1, wherein the processing circuitry is further configured to:
receive total geographic and emission data for a first communications link;
store the total geographic and emission data;
determine a morphology type for the geographic region between user equipment and a cell forming the first communications link;
determine measured path loss;
determine the predicted path loss based upon the total geographic and emission data, the morphology type, and at least one parameter value of the morphology type;
determine if a difference between the predicted path loss and measured path loss is within a tolerance level; and
if the difference is not within the tolerance level, then determine a new at least one parameter value of the morphology type.

3. The system of claim 2, wherein the total geographic and emission data comprises sets of received power levels and corresponding geographic location data at from more than one user equipment, a transmit frequency of each of at least one cell whose received power level is measured by the more than one user equipment, an identifier for each of the at least one cell, a geographic location of an antenna of each of the at least one cell, and an equivalent isotropic radiated power (EIRP) of each of the at least one cell; and
where each of the more than one user equipment are otherwise utilizing a communications network, including the at least one cell, for another intended purpose.

4. The system of claim 2, wherein determine the new at least one parameter value of the morphology type comprises perform a Monte Carlo simulation.

5. The system of claim 2, wherein the processing circuitry is further configured to:
determine whether the user equipment is inside of a building; and
if the user equipment is determined to be inside of a building, then create and store a flag.

6. The system of claim 1, wherein the processing circuitry is further configured to:
receive morphology data for the geographic region; and
set initial values for parameters of morphology classes.

7. The system of claim 6, wherein the received morphology data comprises received morphology classes;
wherein the processing circuitry is further configured to map the received morphology classes to morphology classes used by the processing circuitry.

8. The system of claim 1, wherein the processing circuitry is further configured to receive terrain data.

9. A method for determining morphology parameters, comprising:
determining an average value of at least one morphology parameter based upon at least one new value of a morphology parameter;
determining at least one predicted path loss based upon the average value of at least one morphology parameter and a morphology type, wherein path loss is a reduction in a power of a signal between two points separated by morphology of the morphology type;
determining at least one difference between each pair of measured path loss and predicted path loss;
determining values of statistical parameters of the at least one difference;
determining if the values of the statistical parameters meet statistical requirements;
if the values of the statistical parameters meet the statistical requirements, storing the average value of morphology parameters; and
if the values of the statistical parameters do not meet the statistical requirements, then optimizing the average value of the at least one morphology parameter.

10. The method of claim 9, further comprising:
receiving total geographic and emission data for a first communications link;
determining a morphology type for a geographic region between user equipment and a cell forming the first communications link;

determining measured path loss;
determining the predicted path loss based upon the total geographic and emission data, the morphology type, and at least one parameter value of the morphology type;
determining if a difference between the predicted path loss and measured path loss is within a tolerance level; and
if the difference is not within the tolerance level, then determining a new at least one parameter value of the morphology type.

11. The method of claim 10, wherein receiving the total geographic and emission data comprises receiving sets of received power levels and corresponding geographic location data at from more than one user equipment, a transmit frequency of each of at least one cell whose received power level is measured by the more than one user equipment, an identifier for each of the at least one cell, a geographic location of an antenna of each of the at least one cell, and an equivalent isotropic radiated power (EIRP) of each of the at least one cell; and
where each of the more than one user equipment are otherwise utilizing a communications network, including the at least one cell, for another intended purpose.

12. The method of claim 10, wherein determining the new at least one parameter value of the morphology type comprises performing a Monte Carlo simulation.

13. The method of claim 10, further comprising:
determining whether the user equipment is inside of a building; and
if the user equipment is determined to be inside of a building, then creating and storing a flag.

14. The method of claim 9, further comprising:
receiving morphology data for a geographic region; and
setting initial values for parameters of morphology classes.

15. The method of claim 14, wherein receiving morphology data comprises receiving morphology classes; and
further comprising mapping the received morphology classes to a different morphology classes.

16. The method of claim 9, further comprising receiving terrain data.

17. A non-transitory computer readable medium storing a program causing a computer to execute a process to determine morphology parameters, the process comprising:
determining an average value of at least one morphology parameter based upon at least one new value of a morphology parameter;
determining at least one predicted path loss based upon the average value of at least one morphology parameter and a morphology type, wherein path loss is a reduction in a power of a signal between two points separated by morphology of the morphology type;
determining at least one difference between each pair of measured path loss and predicted path loss;
determining values of statistical parameters of the at least one difference;
determining if the values of the statistical parameters meet statistical requirements;
if the values of the statistical parameters meet the statistical requirements, storing the average value of morphology parameters; and
if the values of the statistical parameters do not meet the statistical requirements, then optimizing the average value of the at least one morphology parameter.

18. The non-transitory computer readable medium of claim 17, wherein the process further comprises:
receiving total geographic and emission data for a first communications link;
determining the morphology type for a geographic region between user equipment and a cell forming the first communications link;
determining measured path loss;
determining the predicted path loss based upon the total geographic and emission data, the morphology type, and at least one parameter value of the morphology type;
determining if a difference between the predicted path loss and measured path loss is within a tolerance level; and
if the difference is not within the tolerance level, then determining a new at least one parameter value of the morphology type.

19. The non-transitory computer readable medium of claim 18, wherein receiving the total geographic and emission data comprises receiving sets of received power levels and corresponding geographic location data at from more than one user equipment, a transmit frequency of each of at least one cell whose received power level is measured by the more than one user equipment, an identifier for each of the at least one cell, a geographic location of an antenna of each of the at least one cell, and an equivalent isotropic radiated power (EIRP) of each of the at least one cell; and
where each of the more than one user equipment are otherwise utilizing a communications network, including the at least one cell, for another intended purpose.

20. The non-transitory computer readable medium of claim 18, wherein determining the new at least one parameter value of the morphology type comprises performing a Monte Carlo simulation.

21. The non-transitory computer readable medium of claim 18, further comprising:
determining whether the user equipment is inside of a building; and
if the user equipment is determined to be inside of a building, then creating and storing a flag.

22. The non-transitory computer readable medium of claim 17, wherein the process further comprises:
receiving morphology data for a geographic region; and
setting initial values for parameters of morphology classes.

23. The non-transitory computer readable medium of claim 17, wherein receiving morphology data comprises receiving morphology classes; and
further comprising mapping the received morphology classes to a different morphology classes.

24. The non-transitory computer readable medium of claim 17, wherein the process further comprises receiving terrain data.

* * * * *